(12) United States Patent
Fornara et al.

(10) Patent No.: US 10,190,006 B2
(45) Date of Patent: *Jan. 29, 2019

(54) INKS FOR INKJET PRINTERS

(71) Applicant: LAMBERTI SPA, Albizzate (VA) (IT)

(72) Inventors: Dario Fornara, Novara (IT); Alan Nappa, Modena (IT); Tamara Verzotti, Bellinzago Novarese (IT); Paolo Prampolini, Castelnuovo Rangone (IT); Stefano Crespi, Busto Arsizio (IT); Giovanni Floridi, Novara (IT); Giuseppe Li Bassi, Gavirate (IT)

(73) Assignee: LAMBERTI SPA, Alizzabete (IT)

( * ) Notice: Subject to any disclaimer, the term of this patent is extended or adjusted under 35 U.S.C. 154(b) by 129 days.

This patent is subject to a terminal disclaimer.

(21) Appl. No.: 14/777,994

(22) PCT Filed: Mar. 14, 2014

(86) PCT No.: PCT/EP2014/055206
§ 371 (c)(1),
(2) Date: Sep. 17, 2015

(87) PCT Pub. No.: WO2014/146992
PCT Pub. Date: Sep. 25, 2014

(65) Prior Publication Data
US 2016/0319143 A1    Nov. 3, 2016

(30) Foreign Application Priority Data

Mar. 14, 2014  (IT) ............................... VA2013A0019

(51) Int. Cl.
  *B41J 2/21*       (2006.01)
  *C09D 11/322*     (2014.01)
(Continued)

(52) U.S. Cl.
  CPC ............ *C09D 11/322* (2013.01); *B41J 2/01* (2013.01); *B41J 2/2107* (2013.01); *B41M 5/007* (2013.01);
(Continued)

(58) Field of Classification Search
  CPC ... B41J 2/01; B41J 2/211; B41J 2/1433; B41J 2/17; B41J 2/17593; B41J 2/2107;
(Continued)

(56) References Cited

U.S. PATENT DOCUMENTS 4,224,212 A    9/1980  Topham
4,861,380 A    8/1989  Campbell et al.
(Continued)

FOREIGN PATENT DOCUMENTS

EP    1840178 A1 * 10/2007  ........... C09D 11/033
EP    2159269 A1    3/2010
(Continued)

OTHER PUBLICATIONS

Saegusa, T. et al., "Macromeoloecules," 1972 vol. 5, p. 108.

*Primary Examiner* — Manish S Shah
(74) *Attorney, Agent, or Firm* — Mossman, Kumar & Tyler PC

(57) ABSTRACT

Method for decorating green or fired ceramic bodies by inkjet printing including the use of a ceramic inkjet ink which is prepared by milling a ceramic inorganic pigment in an organic medium in the presence of a dispersing agent which is the reaction product of a polyethyleneimine and a 12-hydroxystearic acid and ε-caprolactone co-polyester, until the average particle size of the pigment is between 0.1 and 0.8 μm.

8 Claims, 1 Drawing Sheet

(51) Int. Cl.
  *B41M 5/00* (2006.01)
  *C09D 11/326* (2014.01)
  *B41M 7/00* (2006.01)
  *B41J 2/01* (2006.01)
  *C09D 11/104* (2014.01)

(52) U.S. Cl.
  CPC .......... *B41M 5/0047* (2013.01); *B41M 7/009* (2013.01); *C09D 11/104* (2013.01); *C09D 11/326* (2013.01)

(58) Field of Classification Search
  CPC .... B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC .................................................. 347/95–108
  See application file for complete search history.

(56) References Cited

U.S. PATENT DOCUMENTS 5,700,395 A * 12/1997 Thetford ............... B01F 17/005
  106/504
  6,197,877 B1    3/2001 Thetford et al.
  8,906,464 B2 * 12/2014 Prampolini ............... C03C 8/16
  106/31.05
  9,034,088 B2 *  5/2015 Fornara ............... B41M 5/0047
  106/31.05
  9,039,822 B2 *  5/2015 Fornara .................. C08G 69/44
  106/31.05

FOREIGN PATENT DOCUMENTS

JP          63197529 A    8/1988
  WO      2006126189 A1   11/2006
  WO      2012076438 A1    6/2012

* cited by examiner

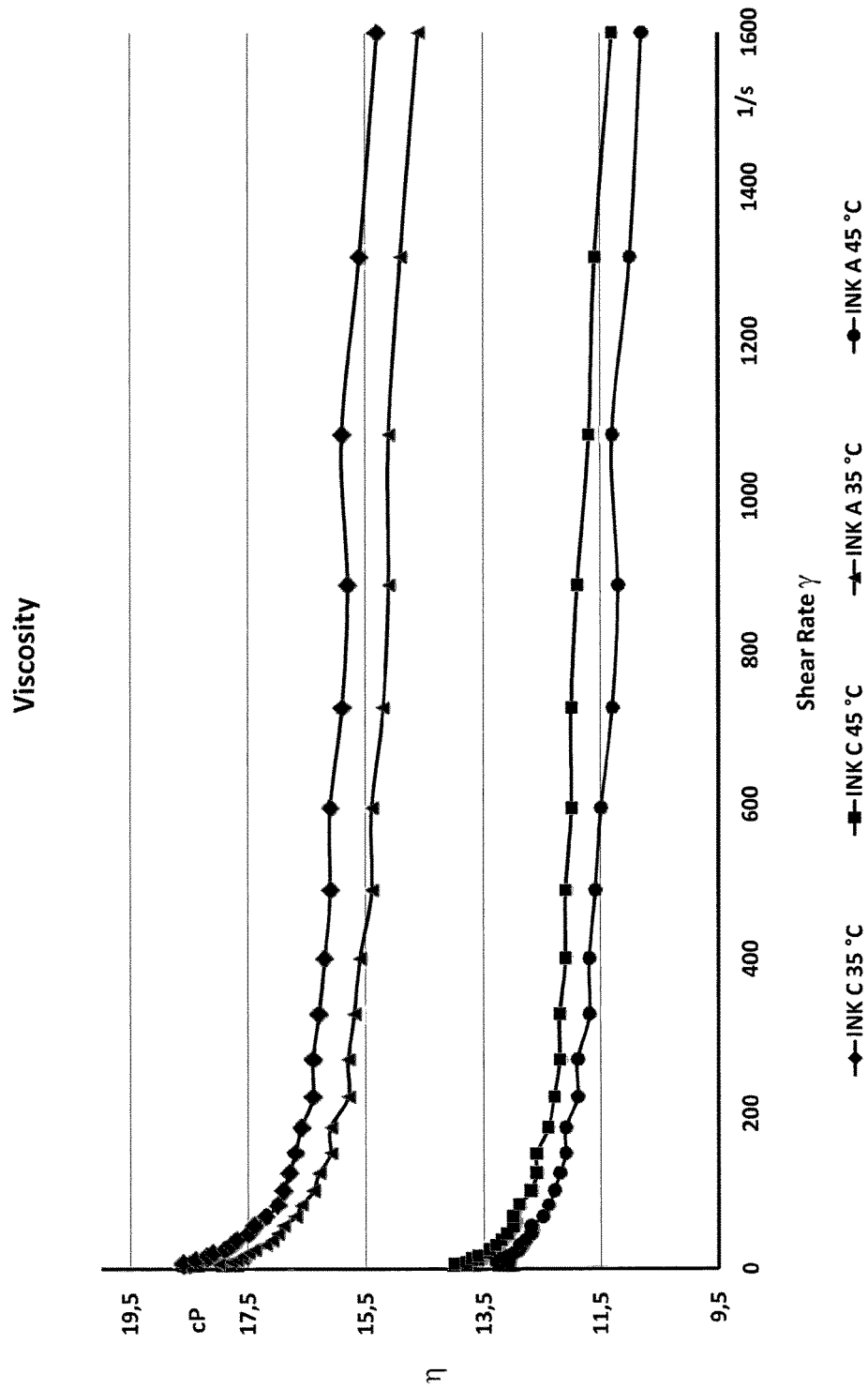

INKS FOR INKJET PRINTERS

FIELD OF THE INVENTION

The present invention relates to ceramic inkjet inks and to a method for decorating green or fired ceramic bodies by the use of inkjet printing.

The ceramic inkjet inks of the invention comprises ceramic inorganic pigments, having average particle size between 0.1 and 0.8 μm, dispersed in an organic medium and a dispersing agent which is the reaction product of a polyethyleneimine and a 12-hydroxystearic acid and ε-caprolactone co-polyester.

BACKGROUND OF THE ART

Most traditional ceramic manufactured products, such as wall tiles and floor tiles, are made of a ceramic body that confers form and mechanical properties to the object; the ceramic body generally has some porosity and poor aesthetic qualities.

Said ceramic body, which is defined "green" or, alternatively, "fired", if previously fired, is then usually coated with a ceramic layer, called ceramic glaze; the ceramic glaze is completely sintered by firing, in such a way to gain suitable superficial aesthetic qualities and, in the meantime, to become a fluid-proof barrier; as a matter of fact, after firing, the ceramic glaze has usually no porosity and it is generally resistant to abrasion and to the attack of chemical agents such as acids, bases, dyes.

The aesthetic finishing of the ceramic material can be completed by a decoration phase, that is by the application of sinterable and variously coloured ceramic materials which are applied according to a preset drawing (décor).

The décor can be applied either on green or fired ceramic body, on which the glaze was previously set, or, in the so called third firing decorations, after the firing, on the sintered glaze.

Different techniques are used to transfer images to the ceramic substrate: i.e. screen printing and photogravure (commonly referred to as rotocolor). These technologies require flat substrate or with minimum roughness and they are suitable for mass production, but have very limited flexibility of new design set up and changeover among designs.

Another technique of printing decoration on ceramics is digital printing by inkjet technique.

Digital printing and decoration by inkjet technique is widely used in multiple sectors, such as graphic arts, textile industry, industrial marking and it is well known, both referring to the printing equipments and also to the inks used.

Peculiarly in ceramic applications, the thermal treatment, which is required once the substrate has been printed, makes the conventional inks, that are used in the other applications and are mainly based on organic pigments, unsuitable for use.

Two kind of inks for inkjet printing of ceramics are known: inks constituted by solutions of metallic cations and inks based on dispersions of inorganic pigments.

As far as inks based on dispersions of inorganic pigments are concerned, it is mandatory that the inorganic pigments are well dispersed into the liquid medium and possess nano-scale dimensions, for the ceramic inkjet ink flows at high speed through the small nozzles of the print head (30-100 μm in diameter).

Nano-scale dispersions of the inorganic pigments are usually obtained by milling with microspheres the pre-dispersed pigments in the medium, in the presence of milling aids.

Examples of ceramic inkjet inks based on dispersions of inorganic pigments in polar organic mediums are described in EP 2159269, WO 2006/126189, EP 1840178; the inks are generically said to contain antisettling and/or dispersing agents.

Nonetheless, there is still the industrial need for improved ceramic inkjet inks based on inorganic ceramic pigments having low viscosity, particle size below 0.8 μm, long shelf life and suitable to be printed on ceramic surfaces and passed through a high temperature kiln to form a permanently sintered glazed print.

It has now been found that the reaction product between a polyethyleneimine and a 12-hydroxystearic acid and ε-caprolactone co-polyester can conveniently be used in the preparation of inkjet inks for ceramic inkjet printing machines. Surprisingly, the reaction product between a polyethyleneimine and a 12-hydroxystearic acid and ε-caprolactone co-polyester, is perfectly suitable, in the milling phase, to fluidize the pre-dispersed inorganic ceramic pigments, allowing their rapid milling and subsequently preventing agglomeration and sedimentation of the nano-scale inorganic ceramic pigments in the final inks. The reaction products between a polyethyleneimine and a 12-hydroxystearic acid polyester are known products that belongs to a wide class of dispersing agents obtained by amidation and/or salification of polyimines and carboxyl terminated polyesters. They have been described in many patents; by way of example we cite: U.S. Pat. No. 4,224,212, U.S. Pat. No. 4,861,380, U.S. Pat. No. 5,700,395, U.S. Pat. No. 6,197,877 and JP 63-197529.

JP 63-197529, in particular, describes dispersing agents obtained by reaction between a polyethylenimine and a block polyester. The block polyester derives from a reaction of a monocarboxylic acid with ε-caprolactone followed by a reaction with 12-hydroxystearic acid. Though according to the general description of JP 63-197529, the dispersing agent can contain a high number of 12-hydroxystearic acid residues (up to 10 moles of 12-hydroxystearic acid residues per mole of ε-caprolactone), the examples show only co-polyesters prepared by a mixture of acids that contains between 10% and 26% (w/w) of 12-hydroxystearic acid.

Such wide class of dispersing agents reported above, is generally suitable for use as dispersing agents for various solids in organic liquids.

However, none of the above mentioned documents hints that the reaction product between a polyethylenimine and a 12-hydroxystearic acid and ε-caprolactone co-polyester, can be used as dispersing agent in applications where the solid is an inorganic vitrifiable ceramic pigment with nano scale dimensions, as required for the preparation and stabilization of ceramic inkjet inks.

The patent application WO 2012/076438 reports a dispersing agent suitable for grinding and stabilizing ceramic inkjet inks and it is obtained by reaction between a polyethylenimine and a polyester derived from ricinoleic acid. In this patent application it is pointed out that a dispersing agent obtained from polyethylenimine and 12-hydroxystearic acid homo-polyester is by far less effective in the ceramic pigments milling at the nanoscale range and dispersing activity, than the dispersing agent derived from polyethylenimine and ricinoleic acid polyester.

Now we found that the reaction product between a polyethylenimine and a 12-hydroxystearic acid and ε-caprolactone co-polyester, in the peculiar application, gives better performance than those of analogous dispersing agents derived from ricinoleic acid instead that from 12-hydroxystearic acid, even when the weight percentage in 12-hydroxystearic acid used in the co-polymer synthesis is high.

DRAWINGS

The reological curves (flow curves at variable shear rates) of a ceramic inkjet ink containing as dispersing agent the reaction product between a polyethylenimine and a 12-hydroxystearic acids-caprolactone co-polyester (Ink A) and of a comparative inkjet ink (Ink C) at 35° C. and 40° C. are reported in FIG. 1

SUMMARY OF THE INVENTION

In one aspect, the invention is a composition for ceramic inkjet inks comprising a ceramic inorganic pigment, an organic medium and a dispersing agent which is the reaction product between a polyethyleneimine and a 12-hydroxystearic acid and ε-caprolactone co-polyester, wherein said co-polyester contains from 10 to 90% (w/w) of residues derived from 12-hydroxystearic acid, from 10 to 90% (w/w) of residues derived from ε-caprolactone and the total sum to 100% is constituted by no more than 30% (w/w) of residues coming from monocarboxylic acids used as starters of the co-polyester and/or from other hydroxycarboxylic acids or $C_6$-$C_{18}$ lactones and wherein said ceramic inorganic pigment has average particle size between 0.1 and 0.8 μm.

In another aspect, the invention is a method for decorating green or fired ceramic bodies by inkjet printing that comprises the following steps:
  i. a ceramic inkjet ink comprising a ceramic inorganic pigment having average particle size between 0.1 and 0.8 μm is prepared by milling an inorganic ceramic pigment having initial average particle size between 1.0 and 10.0 μm in an organic medium, in the presence of a dispersing agent which is the reaction product between a polyethyleneimine and a 12-hydroxystearic acid and ε-caprolactone co-polyester, wherein said co-polyester contains from 10 to 90% (w/w) of residues derived from 12-hydroxystearic acid, from 10 to 90% (w/w) of residues derived from ε-caprolactone and the total sum to 100% is constituted by no more than 30% (w/w) of residues coming from monocarboxylic acids used as starters of the co-polyester and/or from other hydroxycarboxylic acids or $C_6$-$C_{18}$ lactones;
  ii. a glaze is spread on the surface of a green or fired ceramic body;
  iii. the decoration is made by means of inkjet printing, by using one or more ceramic inkjet inks according to point i.;
  iv. the obtained substrate is fired at temperature comprised between 900 and 1250° C. for 15-240 minutes.

DETAILED DESCRIPTION OF THE INVENTION

The inorganic ceramic pigment of the inkjet ink of the present invention shall exhibit an average particle size ($d_{50}$) less than 0.8 μm, preferably from 0.1 to 0.5 μm and most preferably from 0.1 to 0.3 μm, as measured by laser diffraction particle size analysis (ISO 13320-2009).

The average particle size, i.e. the average equivalent diameter, is the diameter where 50 percent by weight of the particles have a larger equivalent diameter, and the other 50 percent by weight have a smaller equivalent diameter.

Any of the recognized classes of pigments used in ceramic decoration (ceramic pigments) may be used such as, for example, zirconates and silicates of Cr, Sn, Ni, Pr, Fe, Co and oxides thereof, and preferably those ceramic pigments selected from ZrPr, ZrPrSi, ZrFeSi, TiCrSb, CoAlZn, ZrVaSi, FeCrCoNi, CrCaSnSi, CoSi, and FeCrZn.

The organic medium present in the ceramic inkjet ink is preferably a polar organic medium or a substantially non-polar aliphatic or aromatic hydrocarbon or a halogenated hydrocarbon, including mixtures thereof.

For example, suitable polar organic mediums are selected among one of glycol ethers or glycol ether esters exhibiting a flash point in excess of 75° C., such as polypropylene glycol, tripropylene glycol monomethyl ether (Dowanol TPM), tripropylene glycol butyl ether (TPB), butyl glycol ether acetate.

Examples of suitable non-polar mediums are long chain aliphatic solvents such as isoparaffins, commercially available as ISOPAR products (ExxonMobil Chemical) and the corresponding products from BP and Total, dearomatised aliphatic hydrocarbons, commercially available as EXXSOL (ExxonMobil Chemical) and the corresponding products from Total, 2-isopropylnaphthalene and 2,6-diisopropylnaphthalene.

The preferred organic mediums are tripropylene glycol monomethyl ether and tripropylene glycol butyl ether.

The dispersing agent, which is the reaction product between a polyethyleneimine and a 12-hydroxystearic acid and ε-caprolactone co-polyester, is obtained by amidation and/or salification of a linear or branched polyethyleneimine with a 12-hydroxystearic acid and ε-caprolactone co-polyester.

Branched polyethyleneimines of differing molecular weight are commercially available, by way of example from BASF (under the trade name Lupasol®) and Nippon Shokubai (under the trade name Epomin®).

Linear polyethyleneimines can be prepared by hydrolysis of poly (N-acyl) alkyleneimines as described by Takeo Saegusa et al. in Macromolecules, 1972, Vol. 5, page 4470.

The polyethyleneimines are preferably branched and have an average molecular weight from 100 to 600,000, more preferably from 1,000 to 200,000, even more preferably from 1,000 to 100,000 and especially from 1,000 to 70,000.

The evaluation of the average molecular weight of polyethyleneimine is well known to the person skilled in the field and it is carried out by size exclusion chromatography, using a light scattering detector, such as an Agilent 1100 differential refractometer equipped with an Agilent 110 VWD UV photometer and a Wyatt Dawn EOS light scattering detector.

The 12-hydroxystearic acid and ε-caprolactone co-polyester may be prepared by polymerization of 12-hydroxystearic acid and ε-caprolactone at temperature between 150 and 180° C., as described for example in U.S. Pat. No. 4,224,212; in the preparation of the co-polyester it is preferred to include an esterification catalyst such as a tin salt of an organic acid, for example tin bis 2-ethylhexanoate, dibutyl tin dilaurate, a tetra-alkyl titanate, for example tetrabutyltitanate, a zinc salt of an organic acid, for example zinc acetate, a zirconium salt of an aliphatic alcohol, for example zirconium isopropoxide, toluene sulphonic acid or a strong organic acid such as a halo acetic acid, for example trifluoro acetic acid.

The weight percent of residues of 12-hydroxystearic acid in the co-polyester is within 10 and 90%, preferably within 30 and 90%, more preferably within 50 and 90%. High percentages of 12-hydroxystearic acid are preferred because surprisingly they do not impair the activity of the dispersing agent and they are economically attractive. The weight percent of residues of ε-caprolactone in the co-polyester is complementary to that of the residues of 12-hydroxystearic acid, unless when the co-polyester includes residues derived from other hydroxycarboxylic acids or $C_6$-$C_{18}$ lactones, such as 12-hydroxydodecanoic acid, 5-hydroxydodecanoic acid, 5-hydroxydecanoic acid, 4-hydroxydecanoic acid and ricinoleic acid, and/or residues derived from unsubstituted monocarboxylic organic acids used as initiators in co-polyester synthesis. When these residues are present, their weight percent is less than 30%, preferably less than 10%; more preferably the 12-hydroxystearic acid ε-caprolactone co-polyester does not contain any other hydroxycarboxylic acid derivatives.

In the preferred embodiment the 12-hydroxystearic acid and ε-caprolactone co-polyester does not contain any residue derived from other hydroxyacids or lactones and it is a random polymer.

The 12-hydroxystearic acid and ε-caprolactone co-polyester shall be carboxyl terminated from one side, and may be eventually started with an organic monocarboxylic acid, different from the 12-hydroxystearic acid, and it can be aromatic, heterocyclic, alicyclic or preferably aliphatic and it is optionally substituted by halogen, $C_{1-4}$-alkoxy groups. Preferably, in this case, the organic monocarboxylic acid is unsubstituted. When the organic monocarboxylic acid is aliphatic, it may be linear or branched, saturated or unsaturated, but it is preferably saturated. The total number of carbon atoms in the starting organic monocarboxylic acid can be as high as 50, but it is preferred that it contains not less than 8, more preferably not less than 12 and especially not less than 14 carbon atoms. It is also preferred that the organic monocarboxylic acid contains not more than 30, more preferably not more than 25 and especially not more than 20 carbon atoms.

Particularly useful effects have been obtained with copolyesters having number-average molecular weight between 800 and 2,000 and polyethyleneimine having a number-average molecular weight of from 1,000 to 70,000.

The mean molecular weight of the 12-hydroxystearic acid and ε-caprolactone co-polyester is determined from the acid value (or "neutralization number" or "acid number" or "acidity"), which is the mass of potassium hydroxide (KOH) in milligrams that is required to neutralize one gram of co-polyester, as it is well known in the field.

The dispersing agent of the invention is obtained by reacting the polyethyleneimine and the above described 12-hydroxystearic acid and ε-caprolactone co-polyester at temperature between 50 and 250° C., preferably in an inert atmosphere. Preferably, the temperature is not less than 80° C. and especially not less than 100° C. and not greater than 150° C.

The weight ratio of 12-hydroxystearic acid and ε-caprolactone co-polyester to polyethyleneimine is preferably from 1 to 100.

At least two moles of co-polyester shall be attached to each mole of polyethyleneimine.

The ceramic inkjet ink typically contains from 5 to 60% by weight of the ceramic pigment, the precise quantity depending on the nature of the pigment and on the relative densities of the pigment and the organic medium. Preferably the dispersion contains from 15 to 45% by weight of the pigment.

The content of liquid organic medium is from 30 to 80% by weight based on the total weight of the ink, preferably from 45 to 80% by weight.

The content of the dispersing agent in the ink is between 2 and 15% by weight based on the total weight of the ink, preferably from 4 to 10% by weight.

The ceramic inkjet ink of the invention is prepared by milling a commercial ceramic inorganic pigment having average particle size between 1.0 and 10.0 μm, in the presence of the liquid organic medium and the reaction product between a polyethyleneimine and 12-hydroxystearic acid and ε-caprolactone co-polyester.

The inorganic ceramic pigment, the liquid organic medium and the reaction product of a polyethyleneimine and a 12-hydroxystearic acid and ε-caprolactone co-polyester may be mixed in any order, the mixture then being subjected to a mechanical treatment to reduce the particles of the pigment to an appropriate size by milling with milling beads having diameters from 0.1 to 0.5 mm.

When the pigment is milled, the temperature is preferably not greater than 45° C.

The viscosity of the ceramic inkjet ink is between 5 and 50 mPa·s, and preferably between 8 and 30 mPa·s.

The invention is further illustrated by the following examples wherein all references are to parts by weight unless expressed to the contrary.

Examples

Preparation of Dispersing Agent A

A mixture of 473.1 parts of 12-hydroxystearic acid, 176.9 parts of ε-caprolactone and 1.3 parts of tin bis 2-ethylhexanoate was stirred, under nitrogen, and heated at 180° C. for 10 hours, removing the esterification water. The product was an oil liquid with an acid value of 49 mg KOH/g (Polyester 1).

25.4 parts of Lupasol WF (polyethylenimine from BASF having MW 25,000) and 324.6 parts of Polyester 1 were stirred, under nitrogen, and heated to 120° C. for 2 hours.

The dispersing agent (Dispers. A) was obtained as a viscous liquid.

Preparation of Dispersing Agent C (Comparative)

A mixture of 470.1 parts of ricinoleic acid, 179.8 parts of ε-caprolactone and 1.3 parts of tin bis 2-ethylhexanoate was stirred, under nitrogen, and heated at 180° C. for 10 hours, removing the esterification water. The product was an oil liquid with an acid value of 51 mg KOH/g (Polyester 2).

25.4 parts of Lupasol WF (polyethyleneimine from BASF having MW 25,000) and 324.6 parts of Polyester 2 were stirred, under nitrogen, and heated to 120° C. for two hours. The dispersing agent (Dispers. C) was obtained as viscous liquid.

Solubility of Dispersing Agents

The solubility of dispersing agents was evaluated at 20° C. at a concentration of 5% by weight in tripropylen glycol butyl ether (TPB) and tripropylen glycol methyl ether (TMP) under stirring with a magnetic stirrer for 5 min. and after storage at 20° C. for 24 hours and for 7 days.

Both Dispers. A and Dispers. C are freely soluble in both solvents.

Preparation of the Ceramic Inkjet Inks

Two ceramic inkjet inks (Ink A and Ink C) were prepared, by using in each a different dispersant (Ink A with Dispers. A and Ink C with Dispers. C).

7.8 g of dispersing agent were stirred and dissolved in 89.7 g of Dowanol TPM in 5 minutes.

52.5 g of blue pigment (cobalt silicoaluminate) were added and mixed for 5 minutes.

The blue pigment had $d_{50}$=2.0 μm, measured by particle Size Analysis (Mastersizer 2000, Malvern Instruments).

200 g of grinding media (YTZ® Grinding Media 0.3 mm, made of Yttrium Stabilized Zirconia Grinding Beads, produced by Nikkato Corporation) and 60 g of the mixture prepared as described above were charged into a 125 ml grinding jar made in zirconium oxide and milled in a planetary ball mill (PM 200 produced by Retsch).

The dispersing agent performances were evaluated by measuring the particle size distribution of the pigment in the inkjet ink after milling, the rheological ink curves and the stability on storage of the inkjet inks at 60° C.

Particle Size Distribution of the Pigment

The particle sizes of the pigment ($d_{50}$), as measured by a Mastersizer 2000 Malvern Instrument, after 3 hours milling, are reported in Table 1

TABLE 1

Milling time and particle size

| InkJet ink | milling time (hours) | $d_{50}$ (μm) |
|---|---|---|
| Ink A | 3 | 245 |
| Ink C * | 3 | 267 |

* comparative

Rheological Curves

The rheological curves (flux curve at variable shear rate) at 35° C. and 40° C. are reported in FIG. 1 for Ink A and Ink C.

Ink A has lower viscosity than that of Ink C at all shear rates.

Stability

The stability of the inkjet inks was evaluated by visual examination of their omogeneity (or phase separation of liquid phases and/or sedimentation) after the storage at 60° C. for 12 days.

Both Ink A and Ink C are omogeneous after 12 days at 60° C.

On the stored inks the rheological curves at 35° and 45° C. were recorded: for both inks no significant variation with time 0 were observed.

From the comparison of the above results we can say that Dispers. A is a better milling aid than Dispers. C (lower particle size with same milling time) and it is better in reducing the viscosity of the ink. It has good solubility characteristics as well as good stabilizing capacity.

The invention claimed is:

1. A method for decorating green or fired ceramic bodies by inkjet printing comprising the steps of:
    i. preparing one or more ceramic inkjet inks by milling a ceramic inorganic pigment having average particle size of between 1.0 and 10 μm in an organic medium in the presence of a dispersing agent which is the reaction product between a polyethyleneimine and a 12-hydroxystearic acid and ε-caprolactone co-polyester, wherein the co-polyester comprises from 10 to 90% (w/w) of residues derived from 12-hydroxystearic acid, from 10 to 90% (w/w) of residues derived from ε-caprolactone and the total sum to 100% is constituted by no more than 30% (w/w) of residues coming from monocarboxylic acids used as starters of the copolyester and/or from other hydroxycarboxylic acids or $C_6$-$C_{18}$ lactones until the average particle size of the pigment is between 0.1 and 0.8 μm;
    ii. spreading a glaze on the surface of the green or fired ceramic body;
    iii. inkjet printing a decoration onto the glaze employing the one or more ceramic inkjet inks to produce a decorated ceramic body; and
    iv. firing the decorated ceramic body at a temperature between 900 and 1250° C. for 15-240 minutes.

2. The method of claim 1 wherein the ceramic inorganic pigment has an average particle size from 0.1 to 0.5 μm.

3. The method of claim 1 wherein the dispersant is obtained from amidation and/or salification of a linear or branched polyethyleneimine with the co-polyester.

4. The method of claim 1 wherein the co-polyester comprises from 30 to 90% (w/w) of residues derived from 12-hydroxystearic acid.

5. The method of claim 4 wherein the co-polyester comprises from 50 to 90% (w/w) of residues derived from 12-hydroxystearic acid.

6. The method of claim 1 wherein the co-polyester comprises less than 10% (w/w) of residues coming from monocarboxylic acids used as starters of the co-polyester and/or from other hydroxycarboxylic acids or $C_6$-$C_{18}$ lactones.

7. The method of claim 1 wherein the co-polyester is a random co-polyester.

8. The method of claim 1 wherein the ceramic inkjet ink comprises from 5 to 60% (w/w) of the ceramic pigment, from 30 to 80% (w/w) of the organic medium and from 2 to 15% (w/w) of the dispersing agent.

* * * * *